United States Patent [19]

McCormick

[11] 3,796,516
[45] Mar. 12, 1974

[54] BELLOWS PUMP

[76] Inventor: Alan G. McCormick, 645 Aloha, Salt Lake City, Utah 84103

[22] Filed: Aug. 8, 1972

[21] Appl. No.: 278,717

[52] U.S. Cl. .................... 417/63, 417/388, 92/249
[51] Int. Cl. ..... F04b 9/08, F04b 35/02, F04b 43/06
[58] Field of Search ................ 417/388, 63; 92/249; 73/326, 325, 328

[56] References Cited
UNITED STATES PATENTS

| 862,867 | 8/1907 | Eggleston | 417/390 |
|---|---|---|---|
| 1,629,348 | 5/1927 | Ludwin et al. | 73/326 |
| 2,592,381 | 4/1952 | Blackman | 92/249 X |
| 3,304,870 | 2/1967 | Growell et al. | 417/388 |
| 3,338,170 | 8/1967 | Swartz | 417/388 X |
| 3,612,727 | 10/1971 | Drake | 417/388 |
| 3,636,824 | 1/1972 | Clark | 92/249 |
| 3,433,161 | 3/1969 | Vetter | 417/388 |
| 2,713,827 | 7/1955 | Hoop | 417/388 |

Primary Examiner—Carlton R. Croyle
Assistant Examiner—Richard E. Gluck

[57] ABSTRACT

A bellows pump usable for fuel injection, for example, wherein such pump is designed to avoid necessity of close machining tolerances. Bypass valve means is incorporated between the interior of the bellows of the pump and the interior of the casing incorporating the piston drive. Such leakage as occurs from the bellows interior to such casing via the reciprocating piston structure utilized is returned from the casing back to the bellows interior during predetermined portions of the operating cycle. For such manner of operation the piston drive casing and the bellows interior are completely pre-filled with operating hydraulic fluid such as oil. Piston design includes a plastic jacket, such as Nylon, by way of example, so that any particulate matter in the oil used may embed itself therein instead of causing piston failure. An optional feature is to provide a free-floating auxiliary piston, to vary volume flow, itself incorporating a valve return flow passageway.

11 Claims, 4 Drawing Figures

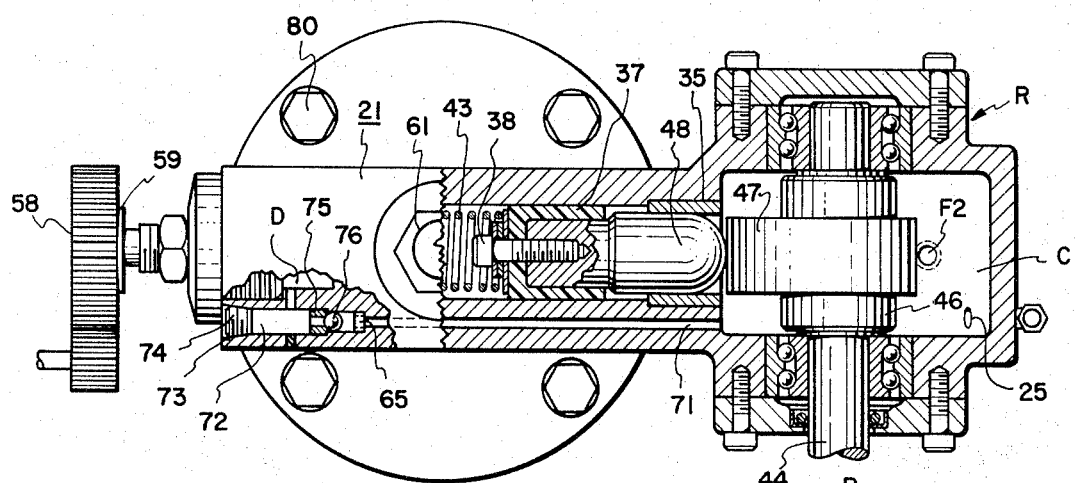
FIG. 1
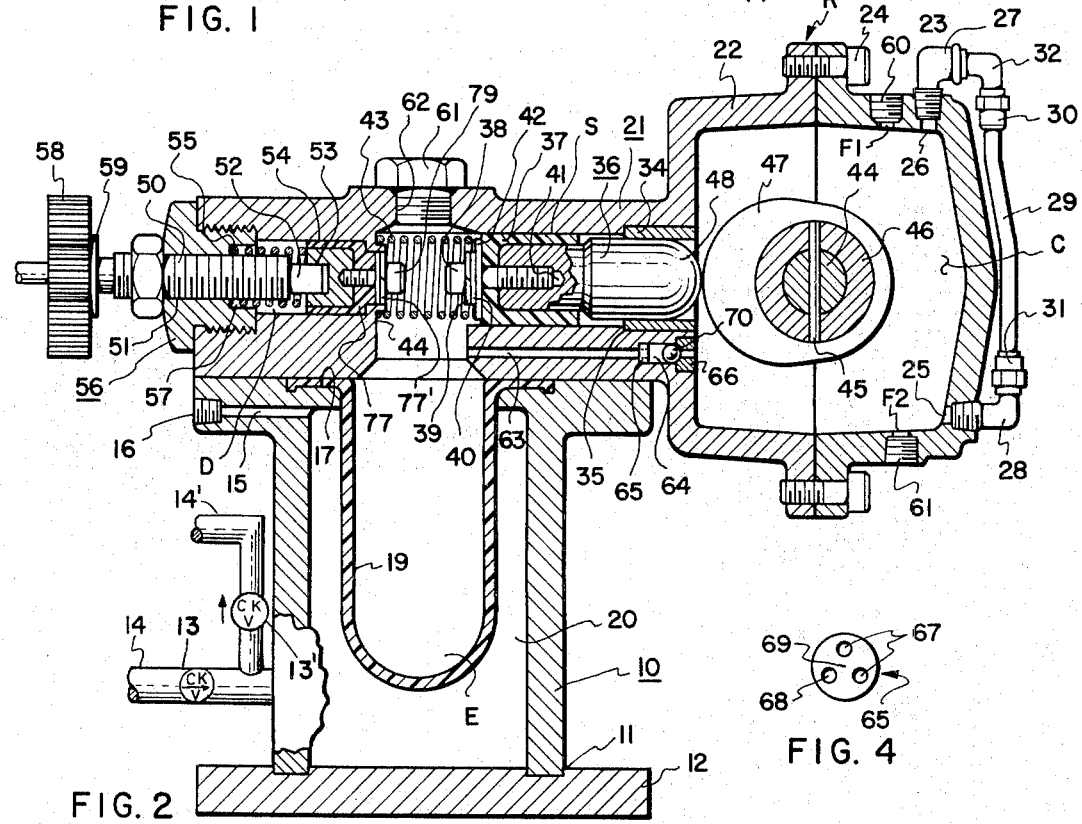
FIG. 2
FIG. 4
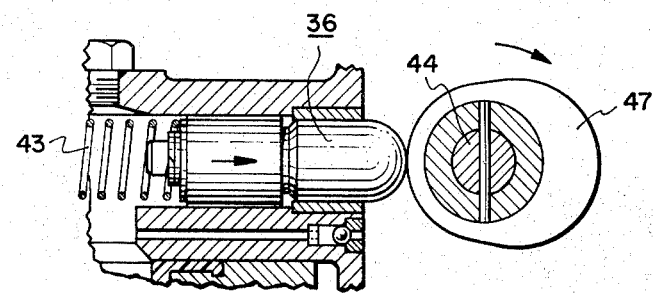
FIG. 3

BELLOWS PUMP

The present invention relates to bellows pumps and, more particularly, to a new and improved pump of such design that operating efficiency is maintained at a maximum while cost of production of the pump is maintained at a minimum.

In the past, bellows pumps have experienced severe leakage problems proximate the piston reciprocating structure used to cyclically expand the bellows. Close machining tolerances of the order of less than one-thousandth of an inch must be maintained in order to avoid leakage of hydraulic fluid from the interior of the bellows past the piston bore structure.

In the present invention a reciprocating piston and cylinder structure is provided between a casing and an expandable bellows, both of which are initially filled with oil. Disposed within the casing is a piston drive structure such as an eccentric cam suitably mounted upon a revolving drive shaft. During the non-pressure stroke of the piston, any prior leakage of oil from the bellows area past the piston is automatically returned through a check-valve passageway back to the bellows area. In this way the proper amount of oil is retained in the bellows, preventing it from rupturing or fatiguing, even though leakage exists past the reciprocating piston.

An auxiliary piston may be incorporated in the structure, to vary pump output flow, and additionally may be provided with such a check-valve return. Thus, the basic piston housing can include a cast bore that need not be ground though may require some machining. In face, the crevices within the bore provide for bore "pools of oil" which additionally lubricate the reciprocating piston and also reduce heat. Accordingly, extremely close tolerances, high-cost seals, and so forth may be done away with in the present pump design.

Accordingly, a principal object of the present invention is to provide a new and improved bellows pump.

A further object of the invention is to provide a bellows pump suitable for fuel injection.

A further object is to provide a bellows pump having bellows and casing chambers having a valve intercommunicating passageway serving as a bypass to accommodate piston journal leakage and/or variable-flow piston leakage.

An additional object is to provide an improved bellows pump utilizing piston reciprocating means and a casing circumscribing the same and valved back to the bellows area of the pump.

An additional object is to provide piston structure in a bellows type pump which is valved and provided with a bypass aperture, this to accommodate internal leakage of such pump.

The features of the present invention may best be understood by reference to the following description taken in connection with the accompanying drawings in which:

FIG. 1 is a top plan, partially in section, of a bellows pump manufactured in accordance with the principles of the present invention in one embodiment thereof.

FIG. 2 is a longitudinal vertical section of the pump taken along the center line of the structure shown in FIG. 1.

FIG. 3 is an enlarged fragmentary detail, principally in section, illustrating piston disposition during an extremity of travel opposite to that shown in FIG. 2.

FIG. 4 is an enlarged plan view of engagement plate that can be used with the ball-valve structure of the pump.

In FIGS. 1 and 2 a cast or fabricated pressure chamber housing 10 is disposed in annular recess seat 11 of base 12 or the latter will simply be integrally cast with the former. The pressure chamber housing 10 is provided with a conventional check-valves 13 and 13' which in turn are provided with intake inlet and pressure outlet conduits 14 and 14', respectively. Air bleeder aperture 15, having threaded portion 16, is likewise provided as indicated in FIG. 2, the latter being constructed to receive an air bleeder valve (not shown). A recessed seat 17 likewise is included in the chamber housing and provides for the seating of expandable bellows 19. The latter may be made of rubber, neoprene, or even metal, by way of example. The important fact to note is that an increase of fluid volume within bellows 19 causes the same to expand and thereby create, assuming an external load or constriction, a high pressure condition as to any fluid existing within cavity 20, to expel the same under such high pressure out valved outlet 13. Of course, the fluid pressure on both sides of the bellows will always be in balance.

Housing 21 may be cast and is provided with a bell-shaped end 22 matching corresponding end 23 forming a casing R. The housing cover 23 is bolted by bolts or machine screw means 24 to the bell-shaped end 22 of housing 21. Cover 23 includes apertures 25 and 26 for receiving the threaded extremities of elbows 27 and 28, as indicated. A transparent oil gauge tube 29 may be made of a suitable plastic and includes end fittings 30 and 31 cooperating with elbows 32 and 28. Housing 21 may include a bushing 34 seated in the annular recess or seat 35. Metal piston 36 is provided with a nylon piston jacket 37. The same is secured in place by bolt 38 being disposed through lock washer 39 and standard washer 40, and being threaded into the threaded aperture 41. A round plate 42 may be provided to back the washer combination and to bear upon the forward face of the piston head. Spring 43 seats in the recessed area 44 and abuts the metal plate or washer 40 in the manner indicated.

Referring to the right hand side of FIG. 2 it is seen that there will be provided a drive shaft 44 to which is pinned, by pin means 45, the central boss 46 of eccentric cam 47. Cam 47 abuts the round spherical or flat surface 48 of piston 36 in the manner indicated and drive the same in a reciprocating manner against compression spring 43. As an alternate, in lieu of the spring, the piston may be connected to the drive by a conventional connecting rod.

In referring to the left hand side of FIG. 2, it is seen that a threaded shaft or stud 50 threads into and through aperture 51 such that the reduced end 52 of the former fits into the interior recess 53 of piston 54, of the same design as the piston and jacket structure on the right-hand side of the drawing. A spring 55 seats in the cap nut 56 at recess 57 thereof.

Handle 58 is secured in any conventional manner to the stud 50 and abuts portion 59 thereof. Filler hole F1 and drain F2 may be provided together with conventional plugs 60 and 61.

Of great importance is the inclusion of a bypass valve aperture 63. The same includes an enlarged valve cavity 64 provided with ball-valve abutment plate 65 and also with apertured valve seat nut 66 threaded therein. The valve plate 65 includes plural apertures 67 and 68 and a central abutment portion 69 which acts as an engagement portion for the ball-valve 70.

A similar valve bypass construction is seen in FIG. 1 wherein aperture 71 is provided and includes an enlarged cavity 72 having threaded portion 73 receiving plug 74. A valve seat member 75 may be positioned and threaded or otherwise secured therein to accommodate ball-valve 76. A second ball-valve abutment plate 65 is provided here as well. It is seen that there is a communication between the chambers C and E in FIG. 2 and also between chamber D, that backs piston 54, and passageway 72 into chamber C. A piston jacket 77 may be made of Nylon and provided with a lock washer and standard washer pair 78, secured in place by machine screw 79 in the same manner as that shown in connection with piston 36.

Bolts 80 are disposed in quadrature and may be used to bolt the lower portion of housing 21 to pressure chamber housing 10.

In operation, cavity C as well as cavity E are completely filled with oil or other hydraulic fluid when the piston 36 is disposed to the right, see FIG. 3, and cam lobe 47 is not engaging the same at its maximum protrusion portion. Then the oil plugs are replaced as at F1 and 62 and, with the area at E being filled with oil, the unit is ready for operation. As the cam shaft 44 is revolved in the direction of the arrow shown in FIG. 3, the piston gradually reciprocates in the direction to the left so as to cause an increase in fluid pressure in cavity E and an expansion of bellows 19. During such expansion, that is, during the higher pressure operating portion of the cycle, ball-valves 70 and 76 will prevent fluid from passing from chamber E directly into chambers C and D via openings 63 and 72. However, the piston head clearance relative to the inside bore or cast surface S of housing 21 may be of the order of from three to ten-thousandths of an inch. Accordingly, a slight leakage may indeed occur between the piston and its journal for return back to chamber C. This return is not objectionable but in fact is desired, for piston lubrication purposes. Further, since the structure is completely prefilled with oil, oil in amount equivalent to the aforementioned leakage will be returned to the bellows via aperture 63 during the return stroke, see FIG. 3, of the piston. Note that during the return stroke of the piston, namely in the direction shown in FIG. 3, the leakage oil that previously escaped to chamber C must be evacuated from such chamber. This is rapidly accomplished by means of the valve including the valve ball 70 in which case fluid proceeds in the direction to the left through aperture 63 to enter the chamber E during the piston's (36) return stroke.

A similar function is accomplished in connection with aperture 71 and the free-floating piston 54. Thus, the plug 74 will be removed and the chamber at 72 filled with oil at the time when the free-floating piston 54 is at its position farthest to the right.

There are a number of advantages in the present construction. Of course, the pump can be seen to be able to handle contaminants, can produce a high pressure output, and machining can be reduced to a minimum. It is most important to note that the present pump, by its design, can handle particulates on the hydraulic drive side of the pump as well as on the other side of the bellows.

Simply a cast bore can be used as a journal for piston travel since any irregularities in the cast surface of the bore will in fact hold the oil as a lubricant for the pistons to slide there across. Any leakage past the piston in the direction to the right, toward chamber C, will be returned in the direction to the left via the valve at ball-valve 66. During the return stroke of the piston in the direction to the right as seen in FIG. 3, the pressure at chamber E will be progressively reduced and any fluid displacement created by the piston will be gradually returned to the interior of chamber E.

The operation of flow adjustor handle 58 is such as ti increase or decrease the degree of expansion of the bellows and hence the volumetric fluid flow out of the outlet 14.

It is to be stressed that the plastic jackets of the two pistons prevent these pistons and their journals from fowling since such foreign particulate matter as may be present in the hydraulic fluid can become embedded in the plastic jackets themselves. The Nylon piston jackets will have an unlimited wear life, whereas the seals they displace have very limited life.

Also to be noted is the fact that tube 29, preferably of a rupturable plastic such as polyethylene, serves as a safety relief valve for encased hydraulic oil should the pump fail or be improperly filled.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the tru spirit and scope of the invention.

I claim:

1. A bellows pump including in combination, housing structure provided with valved conduit means, including inlet and outlet conduits, for admitting fluid to be pumped through said inlet conduit and for expelling pumped pressurized fluid through said outlet conduit, and having an expandable bellows defining an interior cavity and also a pressure exhaust cavity surrounding said bellows and communicating with an external circuit, said housing structure also being provided with a piston bore and a piston-drive cavity; fixed-stroke, reciprocable piston means disposed in a circumferentially, lubricant-fluid passage, clearance-spaced from said piston bore and allowing communication between said bellows' interior cavity and said piston drive cavity, said piston moving from a retracted position to an extended position for increasing bellows size and fluid pressure within said bellows' interior cavity thereby cyclically expanding said bellows and cyclically increasing fluid pressure exterior thereto, said housing structure being provided with and, save for the space-volume surrounding said bellows, being completely filled by a hydraulic lubricant pumping fluid when said piston is in said retracted position, said pumping fluid being thereby operatively disposed between said bellows and said position means, said housing being sealed so as to prevent communication between said pumping fluid and atmospheric fluid surrounding the pump; and means journaled to said housing structure, disposed within said piston-drive cavity, and coacting with said piston for reciprocating the piston, said housing structure being provided with a bypass passageway disposed between and communicating with said bellows' interior cavity and said piston drive cavity; and valve means disposed within said passageway for permitting fluid-flow therethrough solely in a direction from said piston-drive cavity to said bellows' interior cavity on piston return strokes to said retracted position.

2. Structure according to claim 1 wherein said piston includes an outer cup-like plastic jacket and an end plate disposed thereover, said bellows pump including a compression spring seated within said housing structure and coacting against said piston by abutting said end plate.

3. Structure according to claim 1 wherein said housing structure is provided with fluid filler openings disposed proximate said bellows interior cavity and said piston-drive cavity and respectively communicating therewith, and selectively removable plug means releasably disposed within said filler openings.

4. Structure according to claim 1 wherein said piston reciprocating means comprises a shaft journaled to said housing structure and disposed within said piston-drive cavity thereof, and continuously an eccentric mounted to said shaft and engaging said piston.

5. Structure according to claim 1 wherein said housing structure is provided wiith an auxiliary piston bore, a free-floating piston disposed within said auxiliary piston bore, compression spring means backing said free-floating piston and seated within said bore, and externally operable, threaded shaft means disposed within said spring, separate from said piston, adjustably disposed in said housing structure and coacting with said auxiliary piston for varying the maximum length of travel thereof.

6. Structure according to claim 1 wherein said housing structure includes a bushing at said piston bore, said piston including a plastic jacket circumferentially spaced from said piston bore, said piston being journaled by said bushing.

7. Structure according to claim 1 wherein said housing structure proximate said piston drive cavity is provided with plastic translucent tubular means for determining the fluid level within said piston drive cavity.

8. Structure according to claim 7 wherein said determining means is ruptureable, comprising a pressure relief device.

9. Structure according to claim 5 wherein said housing structure is provided with passageway means interposed between said piston-drive cavity and said auxiliary piston bore and valve means for permitting fluid-flow there-between in a direction solely towards said piston-drive cavity.

10. A bellows pump including, in combination, first and second housing structures; valved conduit means, including inlet and outlet conduits, coupled to said first housing structure for admitting fluid to be pumped through said inlet conduit into said first housing structure and for passing pumped pressurized fluid from said first housing structure through said outlet conduit; an expandable bellows secured between said first and second housing structure and defining interior and exterior bellows cavities, said second housing structure including a piston bore; a third structure defining a piston-drive cavity, a piston operatively disposed within said piston bore and circumferentially lubricant-path relieved therefrom and permitting communication between said piston-drive cavity and said interior bellows' cavity; and means journaled within said third structure and engaging said piston for cyclically reciprocating the piston from a retracted position to an extended position to cyclically expand said bellows via hydraulic lubricant pumping fluid, said hydraulic lubricant pumping fluid completely filling said interior bellows' cavity, said piston drive cavity and said second housing structure when said piston is in its retracted position, said second housing structure, said piston drive cavity and said interior bellows cavity constructed to be sealed to prevent communication between said pumping fluid and atmospheric fluid surrounding said pump, said second structure including passageway means disposed between and communicating with said interior bellows' cavity and said piston-drive cavity; and valve means operatively disposed with respect to said passageway means for permitting fluid flow solely in the direction from said piston-drive cavity to said interior bellows' cavity on piston return strokes to said retracted position.

11. Structure according to the claim 10 wherein said second housing structure includes compression spring means seated against said second housing structure for resiliently backing said piston.

* * * * *